United States Patent
Wei et al.

(10) Patent No.: US 11,734,184 B2
(45) Date of Patent: Aug. 22, 2023

(54) EFFECTIVE AVOIDANCE OF LINE CACHE MISSES

(71) Applicant: Micron Technology, Inc., Boise, ID (US)

(72) Inventors: Meng Wei, Shanghai (CN); Shi Bo Zhang, Shanghai (CN); Tao Xiong, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/687,103

(22) Filed: Mar. 4, 2022

(65) Prior Publication Data

US 2022/0261353 A1 Aug. 18, 2022

Related U.S. Application Data

(63) Continuation of application No. 15/733,358, filed as application No. PCT/CN2019/127367 on Dec. 23, 2019, now Pat. No. 11,288,198.

(51) Int. Cl.
*G06F 12/0891* (2016.01)
*G06F 12/02* (2006.01)
*G06F 12/0846* (2016.01)
*G06F 12/14* (2006.01)

(52) U.S. Cl.
CPC ...... *G06F 12/0891* (2013.01); *G06F 12/0238* (2013.01); *G06F 12/0848* (2013.01); *G06F 12/1458* (2013.01); *G06F 2212/1021* (2013.01)

(58) Field of Classification Search
CPC ............ G06F 12/0238; G06F 12/0848; G06F 12/0862; G06F 12/0891; G06F 12/0895; G06F 12/1458; G06F 2212/1021; G06F 2212/6028
See application file for complete search history.

(56) References Cited

U.S. PATENT DOCUMENTS

| | | | |
|---|---|---|---|
| 7,793,049 B2 | 9/2010 | Cain et al. | |
| 7,913,040 B2 | 3/2011 | Beckmann et al. | |
| 2016/0019153 A1 | 1/2016 | Lewis et al. | |
| 2018/0314526 A1 | 11/2018 | Grocutt et al. | |
| 2021/0313993 A1* | 10/2021 | Bai | G06F 5/06 |

FOREIGN PATENT DOCUMENTS

| | | |
|---|---|---|
| CN | 1659525 A | 8/2005 |
| CN | 106170774 A | 11/2016 |

OTHER PUBLICATIONS

International Search Report and Written Opinion for International Application No. PCT/CN2019/127367, dated Sep. 29, 2020, 9 pages.

\* cited by examiner

*Primary Examiner* — Aracelis Ruiz
(74) *Attorney, Agent, or Firm* — Lowenstein Sandler LLP

(57) ABSTRACT

A system includes a line cache, a memory device, and a processing device operatively coupled to the line cache and the memory device, The processing device includes a buffer manager and a high-speed mode driver, the processing device to perform operations including: detecting that a received event is located in an events list, wherein events stored in the events list are associated with a set of functions that are known to cause a clock domain crossing between the buffer manager and a host system; enabling access to the line cache; and running, using the high-speed mode driver, in a high-speed mode to execute the set of functions out of the line cache on behalf of the host system.

20 Claims, 10 Drawing Sheets

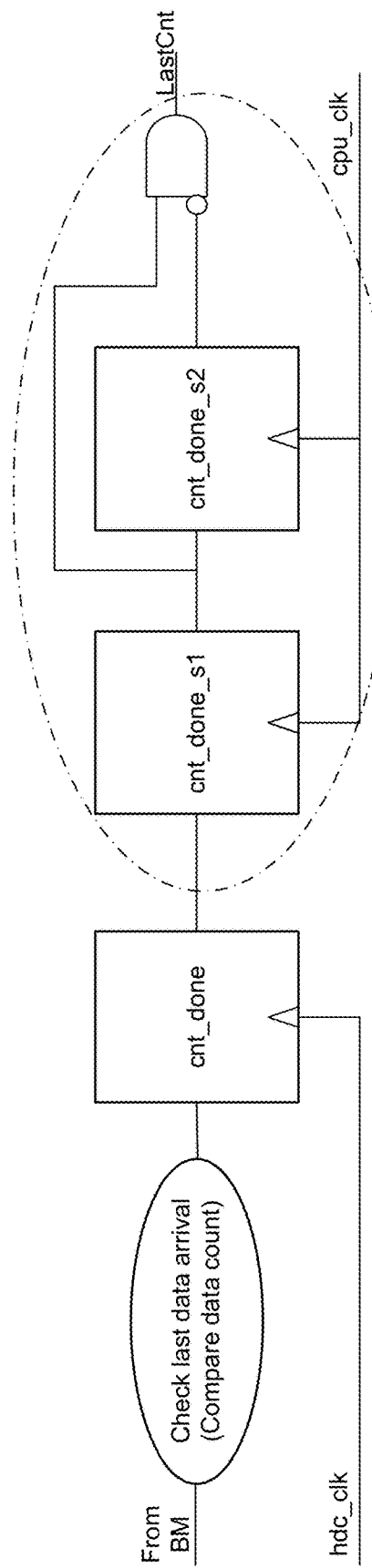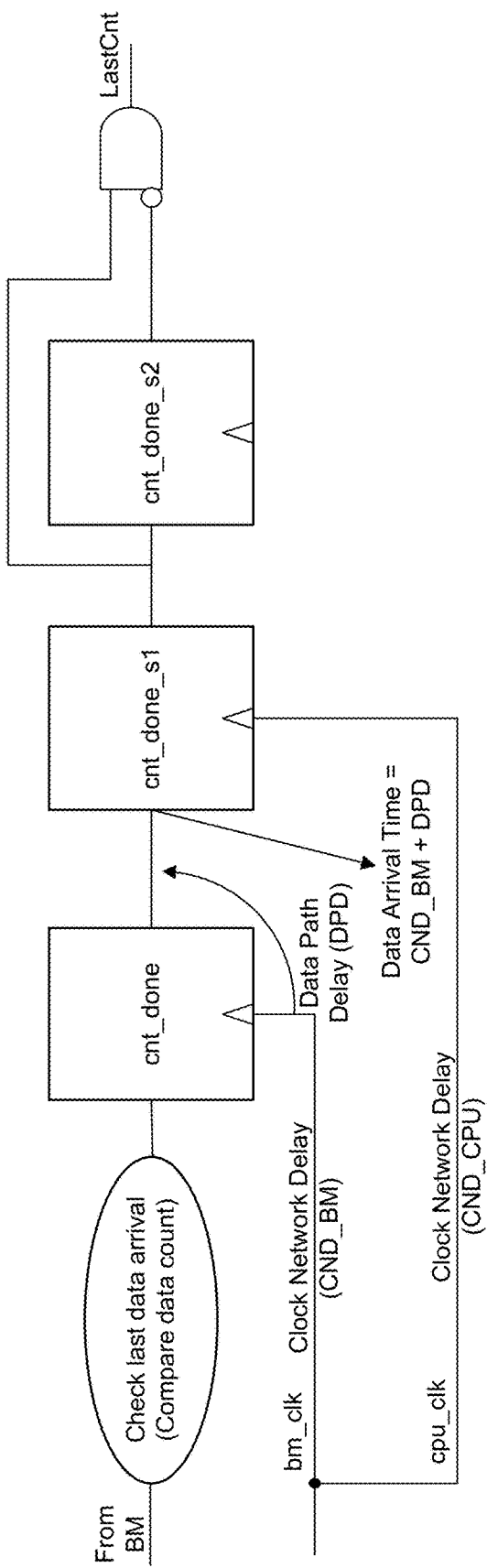
FIG. 3A
FIG. 3B

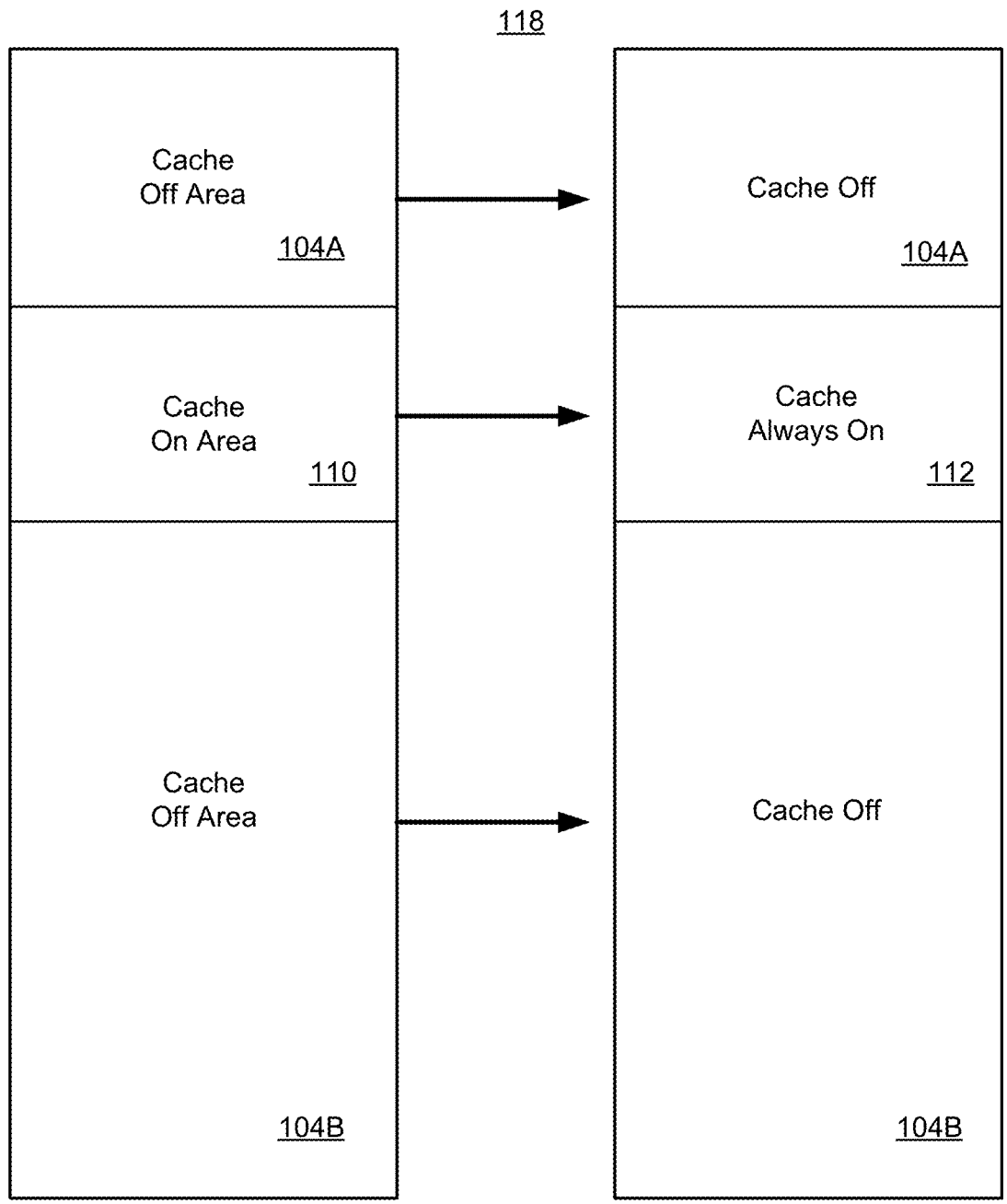

EFFECTIVE AVOIDANCE OF LINE CACHE MISSES

RELATED APPLICATIONS

The present application is a continuation of U.S. patent application Ser. No. 15/733,358, now U.S. Pat. No. 11,288,198, filed Jul. 9, 2020, which is a National Stage Application of PCT Application No. PCT/CN2019/127367, filed Dec. 23, 2019, both of which are incorporated by reference herein.

TECHNICAL FIELD

Embodiments of the disclosure relate generally to memory sub-systems, and more specifically, related to effective avoidance of line cache misses.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3A is a logic diagram of hardware in which clock domain crossing can occur according to some embodiments.

FIG. 3B is the logic diagram of FIG. 3A to include network and data path delay terms according to various embodiments.

FIG. 6A is a block diagram of a cache on area and other cache off areas of line cache according to an embodiment.

FIG. 6B is a block diagram of the line cache of FIG. 6A in which the cache on area is always on or always loaded with critical functions, according to an embodiment.

DETAILED DESCRIPTION

Figure 1A:
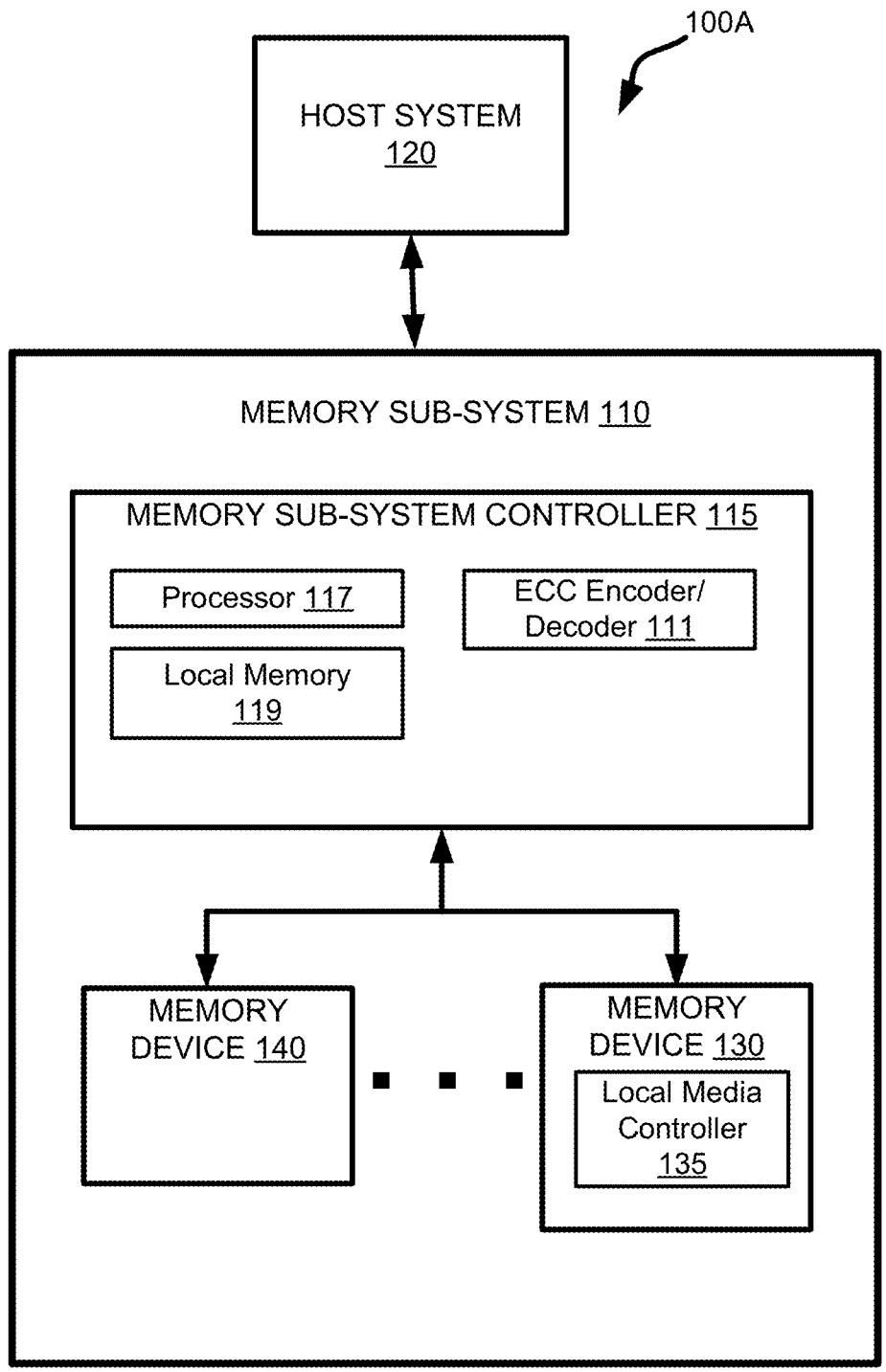
FIG. 1A illustrates an example computing system that includes a memory sub-system according to embodiments of the present disclosure.

Aspects of the present disclosure are directed to effective avoidance of line cache misses in memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

The memory sub-system can include multiple memory devices or memory devices that can store data from the host system. A line cache is designed to accelerate the data fetching efficiency that can have the effect of improving executing efficiency of the host system (e.g., of a host processor). With line cache enabled, data fetching by the host system (e.g., host processor) can hit the line cache, and thus there is no need to access data from the memory components or memory devices, which would take significantly more time. But, the data fetching by the host system could also miss in the line cache, which results in a line cache engine of the line cache needing to fetch data in a burst from the memory devices for the host system. Once fetched, this data can then be retained in the line cache until evicted.

A miss at the line cache has at least two impacts on the host system. First, the miss at the line cache causes the line cache to fetch the data from the memory devices, which costs time, as mentioned. Further, the miss at the line cache could introduce a line cache hardware problem, which can cause the host system to crash in some cases. In at least one instance of such a line cache hardware problem, a clock domain crossing (CDC) between a buffer manager (of the memory sub-system) and the host system can cause an instruction (or function code) that is supposed to be pulled into the line cache to arrive out of sync, e.g., and thus arrive late. As a result, the host system can read the wrong information or jump to the wrong location in instruction code, which can cause an error that, in some circumstances, causes the host system to crash and have to be restarted.

As it has been determined that line cache misses can trigger such errors, and in some cases system crashes, the present embodiments disclose how to avoid line cache misses from the perspective of the host system. In one embodiment, an always-on area of line cache can be pre-loaded with critical functions likely to cause the CDC-based line cache hardware problem. Critical functions herein are those that occur infrequently (e.g., no more than a threshold number of days) and are timing sensitive (e.g., time out after between 15 microseconds and a predetermined number of hundreds of milliseconds), which will be discussed in more detail. If a total size of the critical functions do not fit in the always-on area of the line cache, memory sub-system firmware can implement a manual function swap engine, which can trigger pre-loading of multiple lines of the line cache for a critical function before execution of the critical function proceeds. In either approach, code for the critical function is pre-loaded into the line cache, effectively avoiding line cache miss for that critical function.

Advantages of the present disclosure include but are not limited to improving the speed and functionality of a host system by pre-loading critical function(s) into line cache, thus avoiding system slow-down that would otherwise occur. Further, by pre-loading the critical function(s) into line cache, known CDC-based line cache hardware problems can be avoided, as can corresponding system crashes that can occur in some instances. Other advantages will be apparent to those skilled in the art in the features of avoiding line cache misses discussed hereinafter.

FIG. 1A illustrates an example computing system 100A that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and a non-volatile dual in-line memory module (NVDIMM).

The computing system 100A can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100A can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which may communicate over a system bus 150. Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point type and NAND type memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the controller 115 includes an error-correcting code (ECC) encoder/decoder 111. The ECC encoder/decoder 111 can perform ECC encoding for data written to the memory devices 130 and ECC decoding for data read from the memory devices 130, respectively. The ECC decoding can be performed to decode an ECC codeword to correct errors in the raw read data, and in many cases also to report the number of bit errors in the raw read data.

Figure 1B:
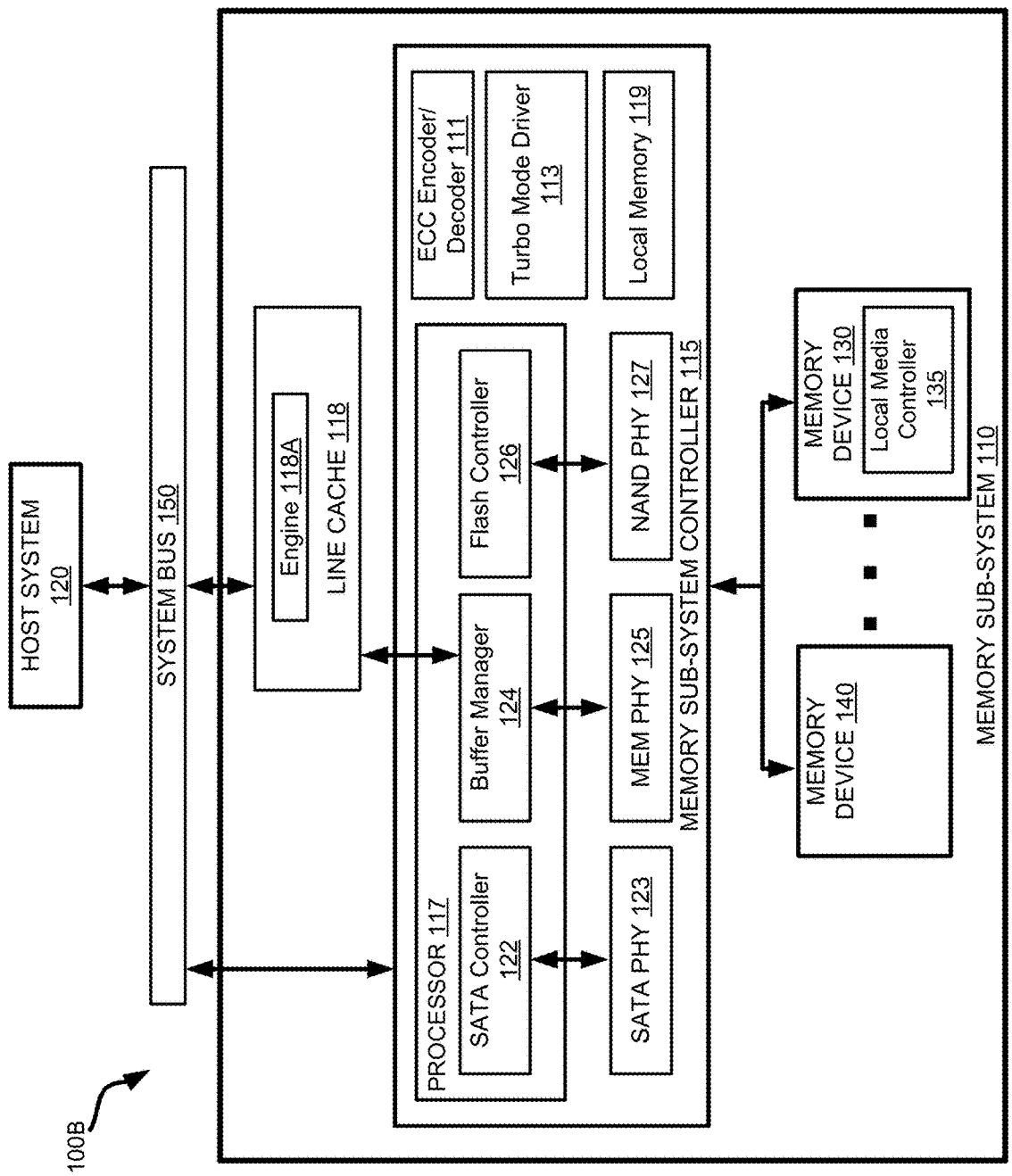
FIG. 1B illustrates a more detailed computing system that includes the memory sub-system with a line cache according to an embodiment.

FIG. 1B illustrates a more detailed computing system 100B that includes the memory sub-system 115 with a line cache 118 according to an embodiment. In disclosed embodiments, the line cache 118 can include a line cache engine 118A. The processor 117 can further include a SATA controller 122 (to control SATA devices), a buffer manager 124 (to control the memory devices 140), and a flash controller 126 (to control NAND or other flash devices). The memory sub-system controller 115 can further include a turbo mode driver 113, a SATA physical layer (PHY) circuit 123, a memory (MEM) PHY circuit 125, and a NAND PHY circuit 127. The PHY components can be located off the memory sub-system controller 115 but still within the memory sub-system 110 in alternative embodiments. In disclosed embodiments, the SATA PHY circuit 123 is a connector between the SATA controller 122 and a SATA device of the memory devices 130; the MEM PHY 125 is a connector between the buffer manager 124 and memory components of the memory devices 140; and the NAND PHY 127 is a connector between the flash controller 126 and a flash device of the memory devices 130. The memory components of the memory devices 140 can be double-data rate (DDR) (or other high-speed memory) DIMMs, and thus the MEM PHY 125 can be a DDR PHY, for example, or some other high-speed memory PHY.

The line cache 118, as illustrated, can be coupled between the buffer manager 124 and the system bus 150. The line cache engine 118A can interface with the host system 120 and the buffer manager 124 in order to write data into the line cache 118 (e.g., when fetched from one of the memory devices 140 in response to a line cache miss) and to read data out of the line cache 118 (e.g., when sent to the host system 120 in the case of a line cache hit). In embodiments, the line cache engine 118A reads (and writes) data in bursts of the granularity of a cache line partition, which is commonly 64 bytes, but could be more or less than 64 bytes of data depending on implementation.

In disclosed embodiments, the turbo mode driver 113 can be firmware executable by the processor 117 in order to operate in a faster (e.g., turbo) mode that includes fetching code and data (including execution of the critical functions) out of the line cache 118. Turbo mode thus has a direct impact of increasing speed of execution of timing-sensitive functions. Normal mode, in contrast, includes fetching code and data (as well as execution of other functions) out of one of the memory devices 140 at a much slower speed. The present disclosure will describe circumstances in which the turbo mode driver 113 can be invoked to go into the turbo mode of operation, e.g., to enable access to the line cache 118 in order to execute functions out of the line cache 118. Likewise, the turbo mode of operation can be disabled, e.g., to disable access to the line cache 118 during normal operation.

Figure 2:
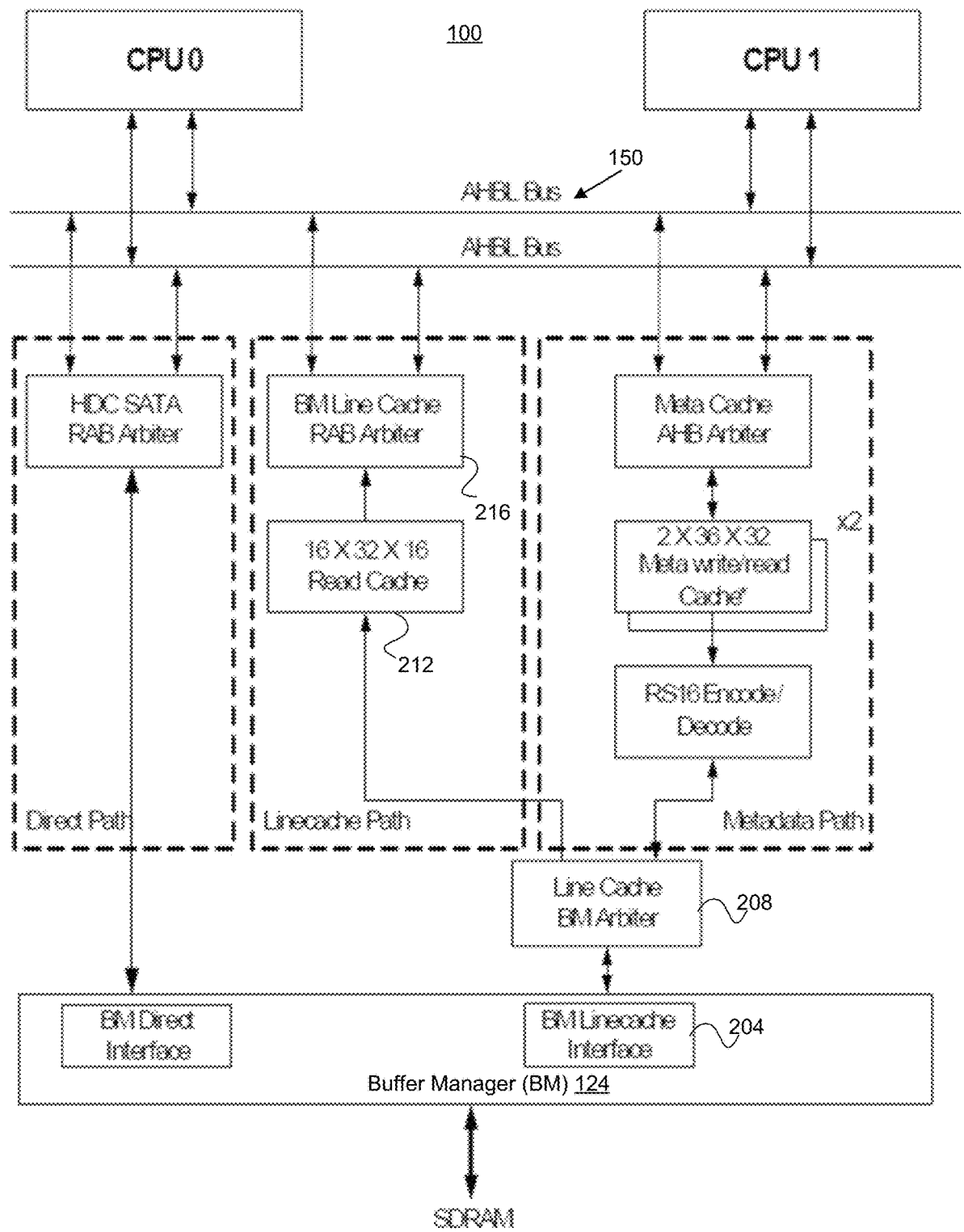
FIG. 2 is a block diagram that illustrates employment of multiple cache in a memory path of various memory devices according to an embodiment.

FIG. 2 is a block diagram that illustrates employment of multiple cache in a memory path of various memory devices according to an embodiment. In pertinent embodiments to the present disclosure, the example computing environment 100B further includes at least two host processors (CPU0 and CPU1) within the host system 120, and the system bus 150 can be an advanced host bus lite (AHBL) protocol bus to communicate with the memory sub-system 110. Within the memory sub-system 110, a line cache memory path from the buffer manager (BM) 124 goes through a BM line cache interface 204, a line cache BM arbiter 208, a read cache 212, and a BM line cache arbiter 216, which is coupled to the AHBL protocol bus. In one embodiment, the BM line cache arbiter 216 is the same as the line cache engine 118A and the read cache 212 is the line cache 118 (FIG. 1).

In various embodiments, the read cache 212 can include several cache lines of 64 bytes, although different sized cache lines are envisioned. In an embodiment, the read cache 212 is read-only. The starting address of each cache line can be 64 bytes aligned. If a miss occurs on a CPU access, one cache line can be invalidated and a 64-byte burst request is generated to the buffer manager 124. The invalidated cache line can be selected based on an LRU (Least Recently Used) scheme, where the LRU is shared between the dual CPU core (CPU0 and CPU1). When data is returned from the memory device 140, the CPU wait state can be released and data be presented back to the system bus 150. The cache logic (e.g., the line cache BM arbiter 208) may continue to store all 64 bytes from memory into the cache line.

FIG. 3A is a logic diagram of hardware in which clock domain crossing (CDC) can occur according to some embodiments. The illustrated logic circuitry is to check the last data arrival from the buffer manager 124 and compare it with a data count, e.g., to determine when enough data has accumulated for burst communication to the CPU0 or CPU1, for example. At the left of FIG. 3A, two incoming signals include data from the buffer manager 124 (e.g., "From BM") and a clock signal from the controller 115 (e.g., "hdc_clk" where "hdc" stands for host device controller and "clk" stands for clock). The hdc_clk signal can go into a count done (e.g., cnt_done) circuit that can track when sufficient code has arrived for burst communication to the CPU0 or CPU1. At the right, a last count signal (LastCnt) can be output based on inputs from two preceding blocks of circuitry, namely S1 count done (cnt_done_s1) and S2 count done (cnt_done_s2) circuits. The S1 and S2 count done circuits can be driven by a CPU clock (cpu_clk) from either CPU0 or CPU1 of the host system 120.

In various embodiments, because there is no timing checked between the cnt_done circuit and the cnt_done_s1 circuit (e.g., they have asynchronous clock domains), a setup and hold violation can occur between the cnt_done circuit and the cnt_done_s1 circuit, e.g., due to the CDC resulting in non-deterministic operation of the cnt_done_s1 circuit. The dashed line refers to the host system 120 domain and the rest of the logic diagram refers to the memory sub-system 110 domain.

FIG. 3B is the logic diagram of FIG. 3A to include network and data path delay terms according to various embodiments. Further to the logic diagram of FIG. 3A, illustrated is the relationship between the data arrival time and clock network delay of the cnt_done_s1 circuit. For example, the data arrival time can be equal to the clock network delay (CND_BM) of bm_clk and the data path delay (DPD). The clock network delay (CND_CPU) can be equal to the cpu_clk signal. If data arrives in an unstable window of a rising edge of the cpu_clk signal, there is a chance to get metastability, e.g., where a digital electronics system can persist for an unbounded time in an unstable equilibrium or metastable state. The unstable window can be approximately between the (cpu_lk rising edge—setup time) and (cpu_clk rising edge and hold time), which is visually illustrated in the setup and hold window of FIG. 4.

Figure 4:
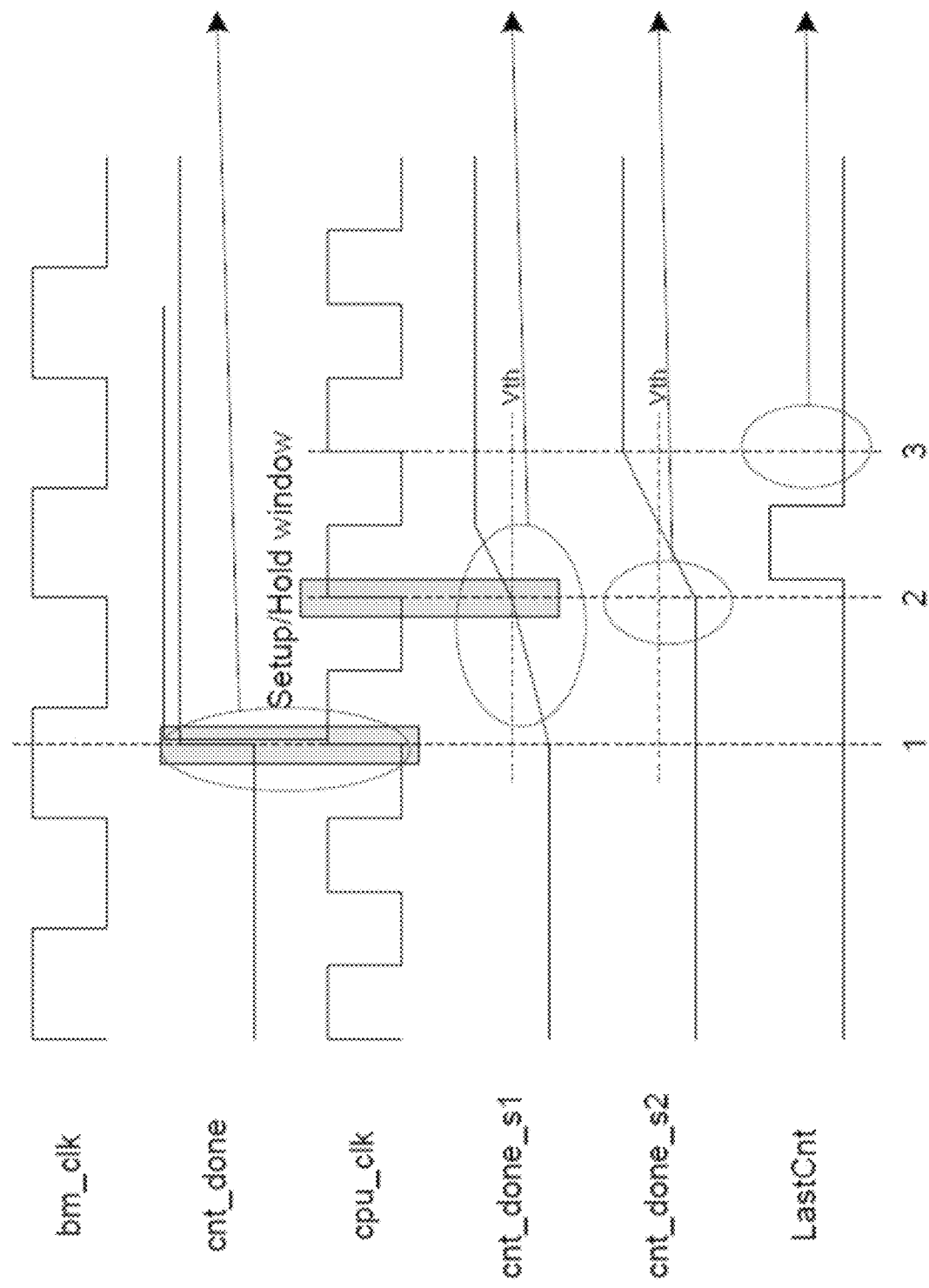
FIG. 4 is a graph to illustrate timing of the clocks signals of FIGS. 3A-3B to show the clock domain issue according to an embodiment.

FIG. 4 is a graph to illustrate timing of the clocks signals of FIGS. 3A-3B to show the clock domain issue according to an embodiment. From top to bottom are: i) the buffer manager (BM) 124 clock (bm_clk); ii) the signal at the cnt_done circuit; iii) the clock (cpu_clk) of CPU0 or CPU1 of the host system 120; iv) the signal at the cnt_done_s1 circuit; v) the signal at the cnt_done_s2 circuit; and vi) the signal output as the last count (LastCnt).

Illustrated between the cnt_done signal and the cpu_clk signal is a setup and hold window (e.g., two full clock cycles), during which signals at the cnt_done_s1 and cnt_done_s2 circuits can transition. For example, the cnt_done can change inside of the setup/hold window of the cpu_clk for cnt_done_s1. Due to a setup/hold violation, cnt_done_s1 can rise slowly, meeting a marginal value around a threshold voltage (Vth) in the setup/hold window of cnt_done_s2. Accordingly, cnt_done_s1 can keep rising after the #2 clock edge. Because cnt_done_s2 catches cnt_done_s1 at a high clock value (#2 clock edge), cnt_done_s2 becomes high slowly. Due to the marginal value of cnt_done_s1 at clock edge #2, the LastCnt pulse is not captured high at clock edge #2, as was intended. Accordingly, LastCnt is low at clock edge #2 and also low at clock edge #3, as triggered by the value of cnt_done_s2. The value of LastCnt being low when it should be high can cause late arrival of instruction code to the CPU0 or CPU1, whichever requested the instruction code. As discussed, this late arrival of instruction code can cause an error, which in some cases, can result in a crash of the host system 120.

Figure 5A:
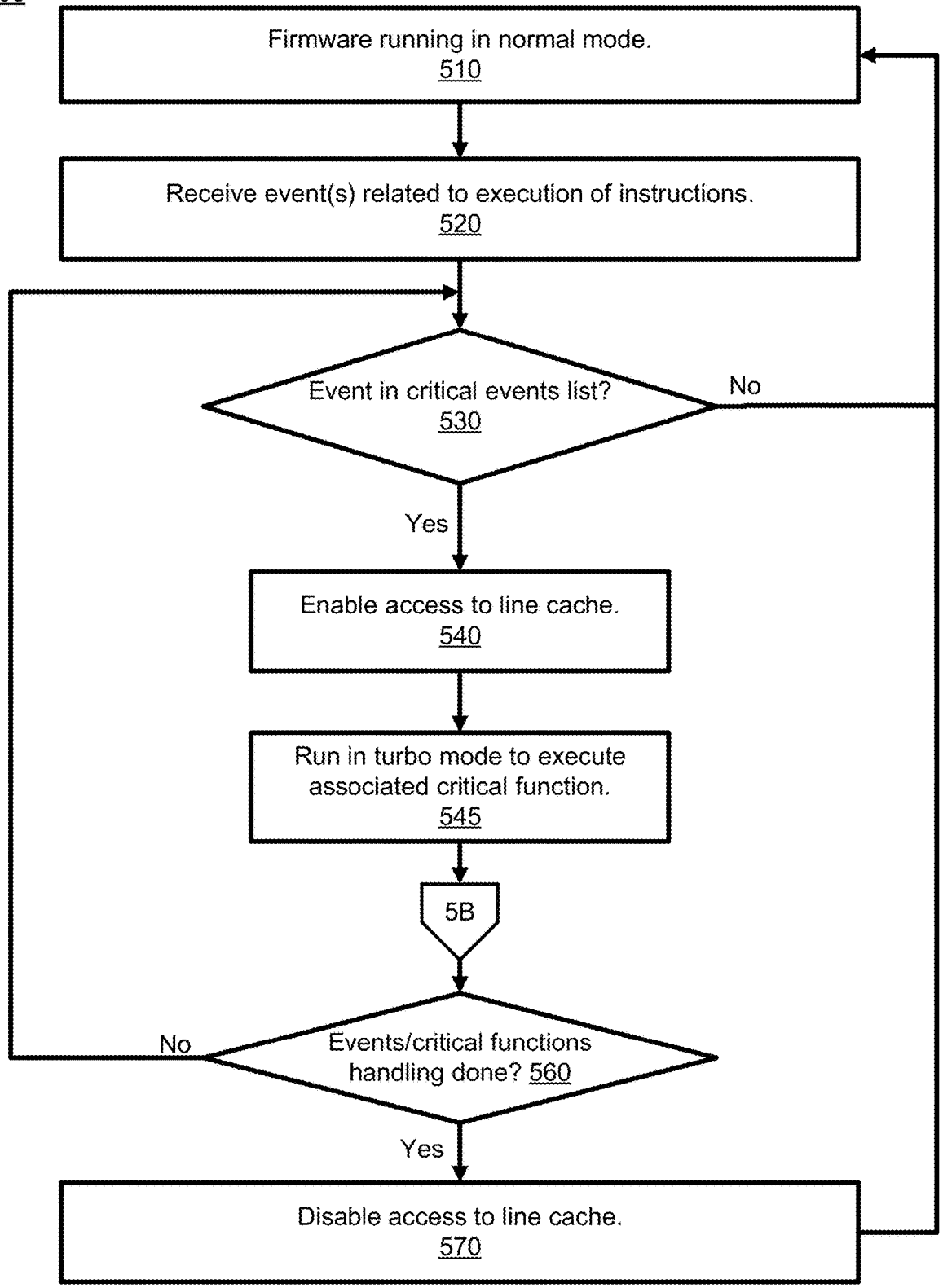
FIGS. 5A-5B are a flow diagram of an example method for execution of effective avoidance of line cache misses according to various embodiments.
Figure 5B:
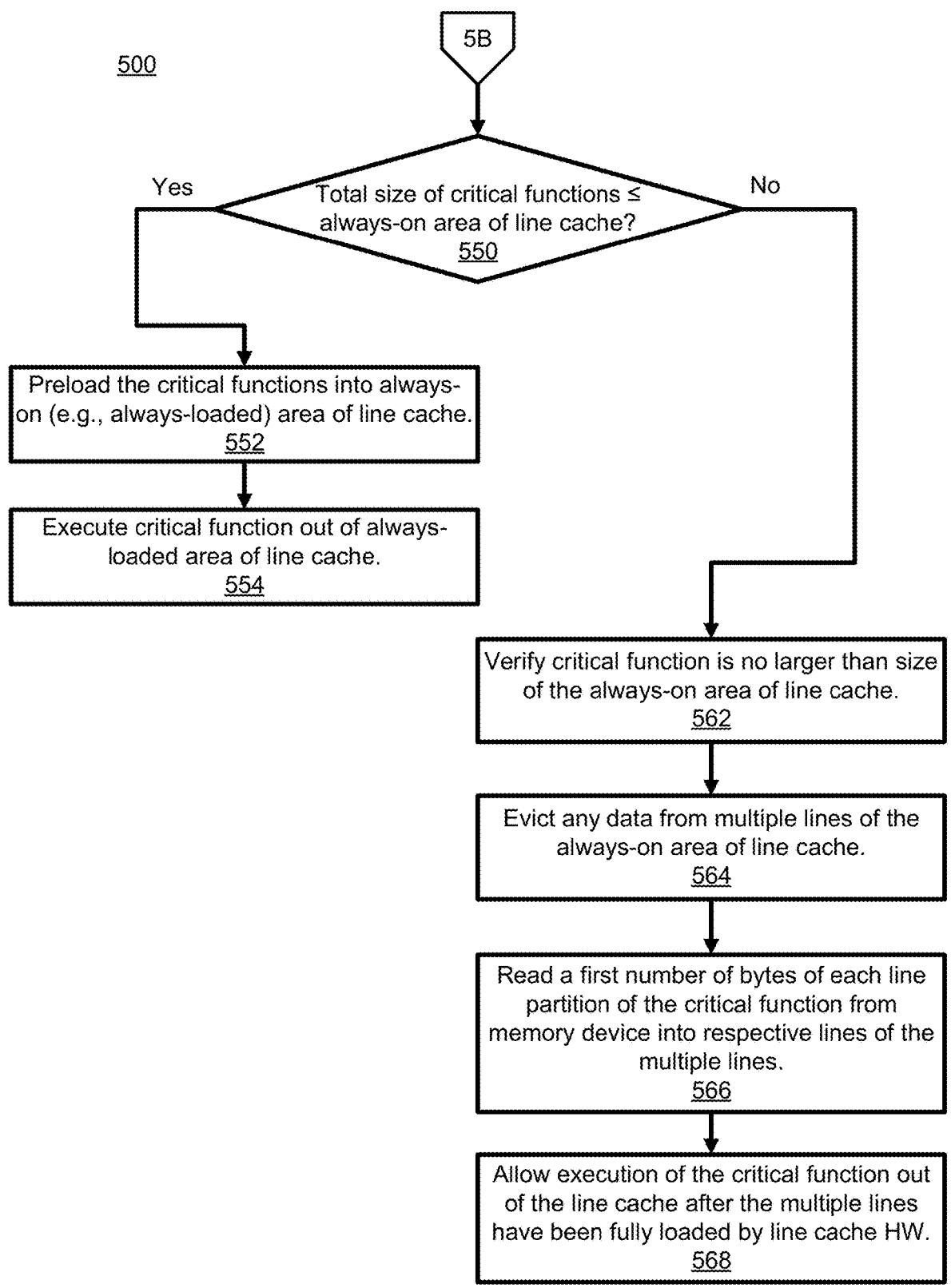

FIGS. 5A-5B are a flow diagram of an example method 500 for execution of effective avoidance of line cache misses according to various embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the controller 115 (e.g., the turbo mode driver 113) of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 5A, at operation 510, the method 500 can begin with the processing logic (e.g., firmware of the controller 115) running in normal mode. As discussed, normal mode can include fetching code and data (as well as execution of other functions or firmware instructions) out of one of the memory devices 140 (as opposed to out of the line cache 118). At operation 520, the processing logic can receive one or more events related to execution of the instructions. In some embodiments, the events are detected as, or corresponding to, certain types of functions executable in firmware. Such detection can include identification of code segments or particular firmware functions.

At operation 530, the processing logic can determine whether a received event is in a critical events list. For example, a database or data structure (e.g., stored in the local memory 119) can include a list of critical events. The critical events can be timing sensitive enough to run in the line cache 118 and require global resources to speed up execution of corresponding critical functions. These critical events, by way of example, can include multiple logging events, a sanitize command, a smart command transport command, a write uncorrectable command, a download firmware command, and a trim command. Critical functions can be associated with these events, and be executed to carry out the critical event.

In various embodiments, the corresponding critical functions are functions that are performed infrequently (e.g., no more than once per a threshold number of days, such as a few days, a week, or a number of weeks) and are timing sensitive (e.g., time out after between 15 microseconds and a predetermined number of hundreds of milliseconds, up to and including one or more seconds). For example, a SATA COMRESET timeout value is eight seconds; a clean power cycle recovery time is 100 milliseconds (ms); a dirty power cycle recovery time is one second; and for a dirty power down, an SSD drive should complete context saving work in 15 ms. In some embodiments, critical functions can include, but not be limited to, a drive boot up sequence-related function, a sanitize handle function (Sanitize_Handle_Func( )), a smart command transport function (SCT_Handle_Func( )), a write uncorrectable handle function (WUNC_Handle_Func( )), a firmware image download function (DM_Segmented( )), and a trim handle function (Trim_Handle_Func( )), as examples.

If the received event is not in the critical events list, the processing logic can loop back to operation 510 and continue running in normal mode. In contrast, if the received event is in the critical events list, at operation 540, the processing logic can enable access to the line cache 118. In one example, access to the line cache 118 is enabled by setting one or more registers in the local memory 119, which is to include the range of code and data stored in the memory devices 140 that is available for line cache access. Event handling should be as short as possible to reduce the possibility of meeting the CDC-hardware problem during the line cache enablement period.

At operation 545, in response to being directed to execute a critical function associated with the critical event, the processing logic can proceed to run in turbo mode to execute the critical function. Being directed to execute the critical function can be performed by a function call or by setting a program counter address to a start address of the critical function. As discussed, turbo mode can include fetching code and data (including execution of the critical function associated with the critical event(s)) out of the line cache 118 on behalf of the host system 120. Enablement of the turbo mode can be performed globally, and thus the code and data that is located in the line cache range (e.g., according to the registers of the local memory 119) can be fetched by the host system 120 (e.g., CPU0 or CPU1) through the line cache 118 and not directly from the memory device 140.

In various embodiments, a critical event can be handled differently depending on size of the critical functions in comparison to a size of an always-on area of the line cache, as will be discussed with reference to FIG. 5B and FIG. 6. At operation 560, the processing logic can detect termination of execution of pending critical functions, and thus handling of pending critical events. If not all critical events (or functions) have been fully handled to completion, then the method 500 can loop back to operation 530 and continue with handling additional event(s) as described with relation to operations 530 through 545. If yes, the event(s) have been handled, at operation 570, the processing logic can disable access to the line cache. In one embodiment, access to the line cache is disabled via update or removal of the range of code and data from the registers in the local memory 119 that define the always-on area of the line cache.

With additional reference to FIG. 5B, following operation 545, at operation 550, the processing logic can determine whether the total size of the critical functions is less than or equal to the always-on area of line cache. In one embodiment, the size of the always-on area of the line cache is 32 lines times 64 bytes per line, or 2048 bytes, e.g., approximately 2 kilobytes (KB) in size (although different sizes are envisioned depending on implementation and/or processing mode). FIG. 6A is a block diagram of a cache on area 110 and other cache off areas 104A, 104B of the line cache 118 according to an embodiment. FIG. 6B is a block diagram of the line cache of FIG. 6A in which the cache on area 110 is converted to an always-on area 112 of the line cache 118, according to an embodiment. To be always on means to always be accessible to store code and data to speed up data fetching and execution of critical instructions, which can be performed directly out of the line cache 118.

In disclosed embodiments, if the total size of the critical functions is less than or equal to the always-on area 112 of the line cache, at operation 552, the processing logic can preload the critical functions into the always-on area 112 of the line cache 118. Operation 552 can thereby transform the always-on area 112 of the line cache into an always-loaded area of the cache, e.g., always loaded with the critical functions (at least until system reset). In some embodiments, operation 552 is performed at startup of the host system 120. In other embodiments, operation 552 is performed at initialization of the controller 115.

At operation 554, the processing logic can execute the critical function associated with the received event out of the always-loaded area of the line cache. In this way, execution of the critical function will not miss at the line cache because the critical function is to be always loaded in the line cache 118, e.g., from startup of the host system 120.

Figure 7:
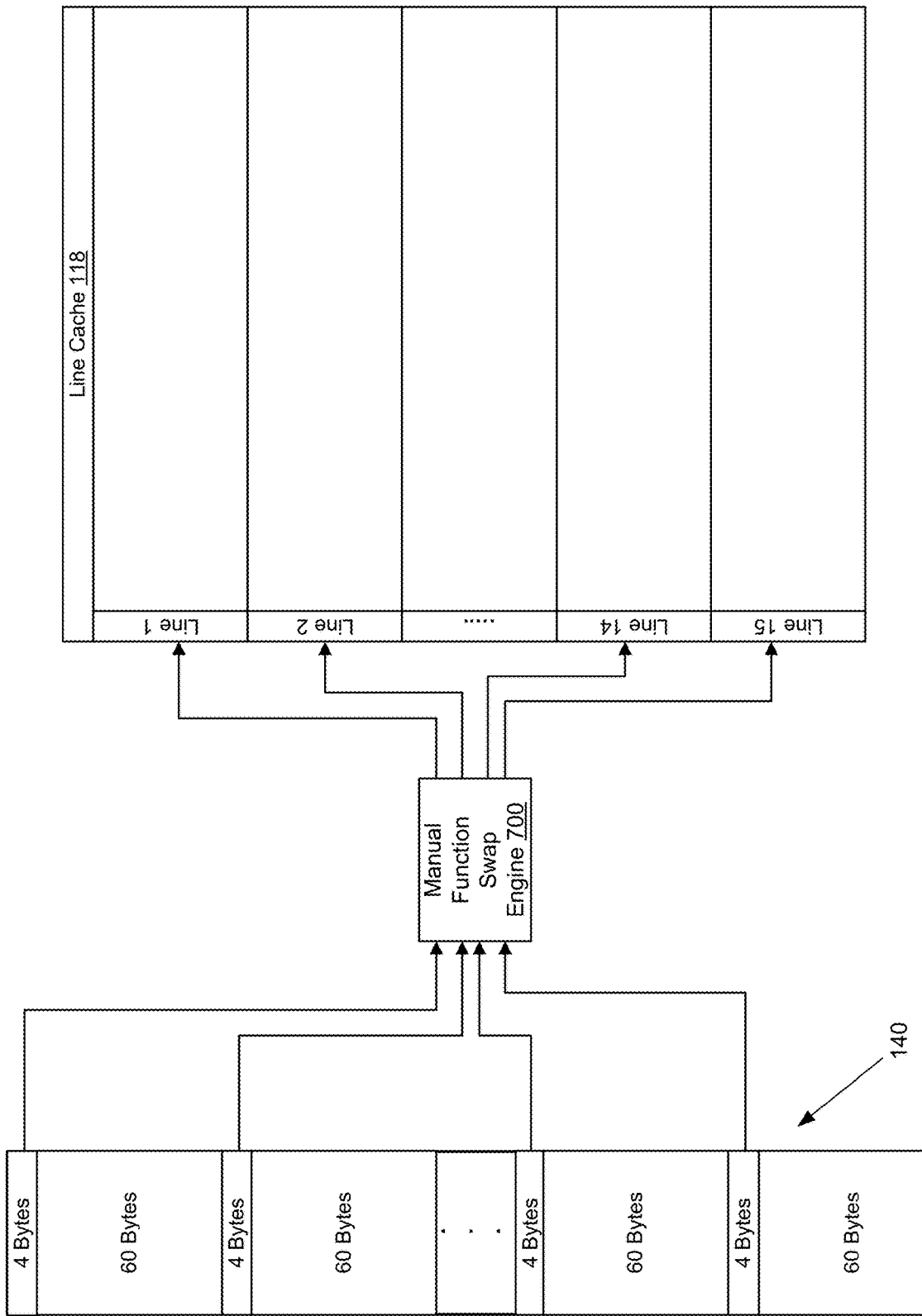
FIG. 7 is a block diagram of functionality of a manual function swap engine with reference to the line cache, according to an embodiment.

With continued reference to FIG. 5B, if, at operation 550, the total size of the critical functions are greater than the always-on area 112 of the line cache 118, the method 500 can branch to an alternative embodiment in which the always-on area 112 is not always loaded with all the critical functions. More specifically, the firmware of the controller 115 can implement a manual function swap engine 700. FIG. 7 is a block diagram of functionality of the manual function swap engine 700 with reference to the line cache 118, according to an embodiment. The manual function swap engine 700 can operate to swap out data in lines of the line cache (e.g., according to least recently used or the like algorithm), and swap in the critical function associated with the received event before the processor 117 is allowed to execute the critical function out of the line cache 118. The critical function can be stored, and thus swapped in, from the memory device 140. This can be performed as described in the alternative branch of FIG. 5B.

At operation 562, the processing logic can verify the critical function is no larger than the size of the always-on area of the line cache, e.g., so that the processing logic knows the critical function can be stored in the always-on area 112 of the line cache 118. If this verification fails, although not illustrated for brevity, the method 500 can loop back to operation 510 and normal execution as execution out of the line cache 118 may not be possible.

At operation 564, the processing logic (e.g., the manual function swap engine 700) can evict any data from multiple lines of the always-on area 112 of the line cache. This data eviction is optional in the sense that the eviction occurs when needing to free up sufficient cache lines to import the critical function into the line cache 118.

At operation 566, the processing logic (e.g., the manual function swap engine 700) can read a first number of bytes of each line partition of the critical function from the memory device (e.g., one of the memory devices 140) into respective lines of the multiple lines of the line cache 118. As illustrated in FIG. 7, this number of bytes may be a small number like two bytes, four bytes, or six bytes in different embodiments. Reading in this small number of bytes may not take very much time, but advantageously, can trigger hardware of the controller 115 to automatically read in the rest of each line partition of the critical function. The hardware of the controller 115 performs these automatic writing or reading bursts in larger chunks of data, such as 64 bytes (although different number of bytes such as 32 byte or 128 bytes are envisioned).

At operation 568, the processing logic can allow execution of the critical function out of the line cache after the multiple lines of the line cache have been fully loaded by line cache hardware. That is to say, the execution stage of the critical function is separated from the load stage, and thus execution of the critical function is temporarily delayed long enough to ensure that the code of the critical function is first fully loaded into the line cache 118. In this way, a line cache miss is effectively avoided because execution of the critical function can be ensured to hit at the line cache.

Figure 8:
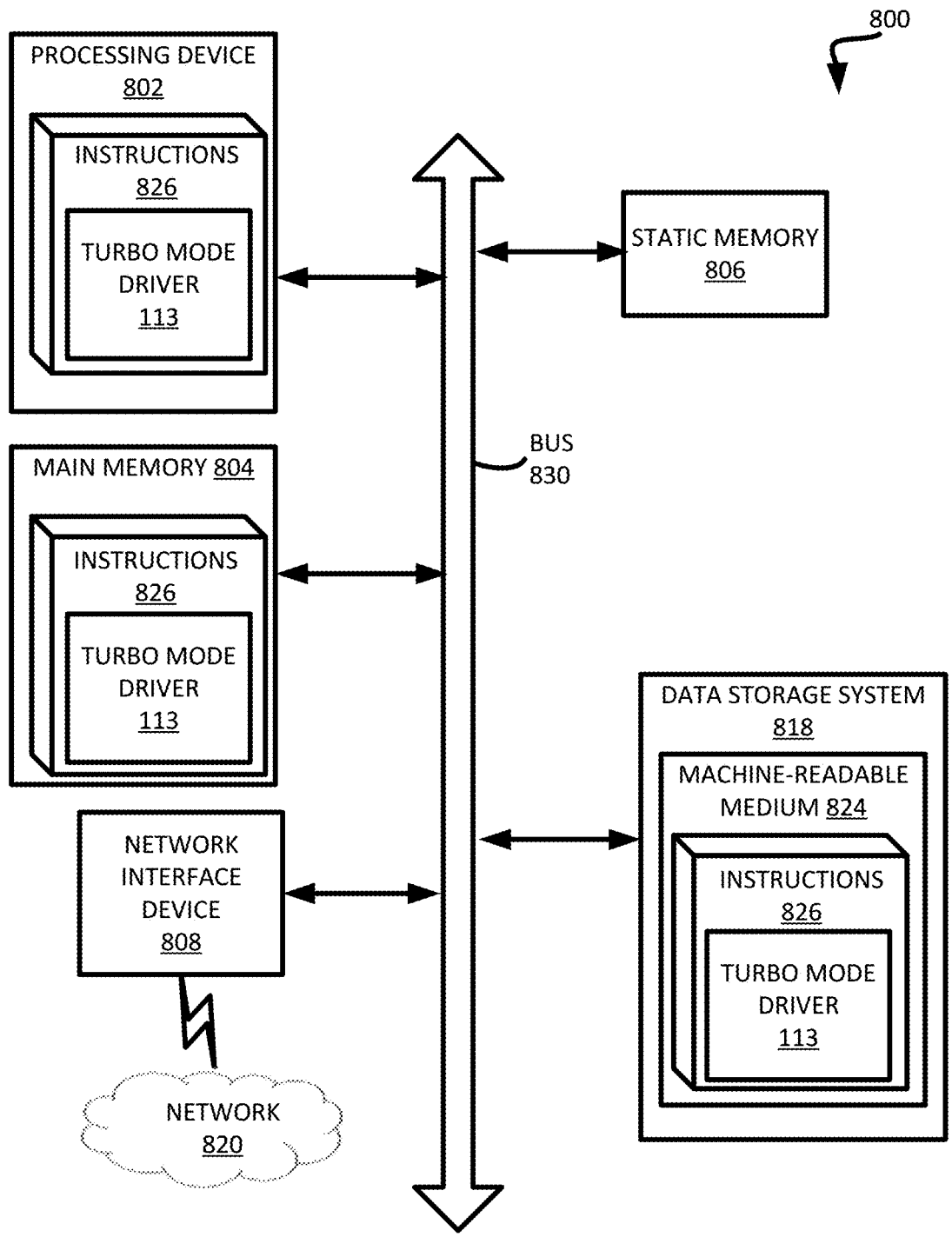
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIGS. 1A-1B) that includes, is coupled to, or utilizes a memory sub-system (e.g., the memory sub-system 110 of FIGS. 1A-1B) or can be used to perform the operations of a controller 115 (e.g., to execute an operating system to perform operations corresponding to the turbo mode driver 113 of FIG. 1B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a non-transitory computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIGS. 1A-1B.

In one embodiment, the instructions 826 include instructions to implement functionality corresponding to an error determining component (e.g., the turbo mode driver 113 of FIG. 1B). While the machine-readable storage medium 824 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a line cache;
    a memory device; and
    a processing device operatively coupled to the line cache and the memory device, the processing device comprising a buffer manager and a high-speed mode driver, the processing device to perform operations comprising:
        detecting that one or more received events are located in an events list, wherein events stored in the events list are associated with a set of functions that are known to cause a clock domain crossing between the buffer manager and a host system;
        enabling access to the line cache;
        determining one or more functions of the set of functions that correspond to the one or more received events; and
        running, using the high-speed mode driver, in a high-speed mode to execute the one or more functions out of the line cache on behalf of the host system.

2. The system of claim 1, wherein the operations further comprise:
    setting one or more registers of the processing device to store an indication of a range of code and data stored in the memory device that are available for cache line access; and
    wherein running in the high-speed mode further comprises:
        accessing the one or more registers; and
        fetching code and data out of the line cache that are identified by values stored in the one or more registers, the code and data to be used in execution of the one or more functions.

3. The system of claim 2, wherein fetching the code and data comprises reading the code and data out of the line cache in bursts of granularity of a cache line partition of the line cache.

4. The system of claim 1, wherein the high-speed mode driver comprises firmware executable by the processing device to operate out of the line cache instead of out of the memory device.

5. The system of claim 1, wherein the operations further comprise, in response to determining that a total size of the one or more functions is less than or equal to a size of an always-on area of the line cache:
    preloading the one or more functions into the always-on area of the line cache; and
    executing the one or more functions out of the always-on area of the line cache.

6. The system of claim 5, wherein the operations further comprise, in response to detecting completion of executing the one or more functions, disabling access to the line cache.

7. The system of claim 1, wherein the operations further comprise, in response to determining that a total size of the one or more functions is greater than a size of an always-on area of the line cache:
    verifying that a function of the one or more functions is no larger than the size of the always-on area of the line cache;
    evicting any data from multiple lines of the always-on area of the line cache to free sufficient cache lines to store the function;
    reading a first number of bytes of each line partition of the function from the memory device into respective lines of the multiple lines; and
    allowing execution of the function out of the line cache after the multiple lines have been fully loaded by hardware of the line cache.

8. The system of claim 7, wherein the operations further comprise, in response to detecting completion of executing the one or more functions, disabling access to the line cache.

9. The system of claim 1, wherein the events list comprises two or more of: multiple logging events, a sanitize command, a smart command transport command, a write uncorrectable command, a download firmware command, and a trim command.

10. The system of claim 1, wherein the one or more functions each comprises one of a drive boot up sequence-related function, a sanitize handle function, a smart command transport function, a write uncorrectable handle function, a firmware image download function, or a trim handle function.

11. A method comprising:
    detecting that one or more events received by a processing device, which is coupled to a memory device, are located in an events list, wherein events stored in the events list are associated with a set of functions that are known to cause a clock domain crossing between a buffer manager and a host system, the processing device comprising the buffer manager and a high-speed mode driver;
    enabling access to a line cache;
    determining one or more functions of the set of functions that correspond to the one or more received events; and running, using the high-speed mode driver, in a high-speed mode to execute the one or more functions out of the line cache on behalf of the host system.

12. The method of claim 11, further comprising:
setting one or more registers of the processing device to store an indication of a range of code and data stored in the memory device that are available for cache line access; and
wherein running in the high-speed mode further comprises:
accessing the one or more registers; and
fetching code and data out of the line cache that are identified by values stored in the one or more registers, the code and data to be used in execution of the one or more functions.

13. The method of claim 12, wherein fetching the code and data comprises reading the code and data out of the line cache in bursts of granularity of a cache line partition of the line cache.

14. The method of claim 11, wherein the high-speed mode driver comprises firmware executable by the processing device to operate out of the line cache instead of out of the memory device.

15. The method of claim 11, wherein, in response to determining that a total size of the one or more functions is less than or equal to a size of an always-on area of the line cache, the method further comprises:
preloading the one or more functions into the always-on area of the line cache; and
executing the one or more functions out of the always-on area of the line cache.

16. The method of claim 15, wherein, in response to detecting completion of executing the one or more functions, the method further comprises disabling access to the line cache.

17. The method of claim 11, wherein, in response to determining that a total size of the one or more functions is greater than a size of an always-on area of the line cache, the method further comprising:

verifying that a function of the one or more functions is no larger than the size of the always-on area of the line cache;
evicting any data from multiple lines of the always-on area of the line cache to free sufficient cache lines to store the function;
reading a first number of bytes of each line partition of the function from the memory device into respective lines of the multiple lines; and
allowing execution of the function out of the line cache after the multiple lines have been fully loaded by hardware of the line cache.

18. The method of claim 17, wherein, in response to detecting completion of executing the one or more functions, the method further comprises disabling access to the line cache.

19. The method of claim 17, wherein the one or more functions each comprises one of a drive boot up sequence-related function, a sanitize handle function, a smart command transport function, a write uncorrectable handle function, a firmware image download function, or a trim handle function.

20. A non-transitory computer-readable medium storing instructions, which when executed by a processing device coupled to a memory device and that comprises a buffer manager and a high-speed mode driver, causes the processing device to perform operations comprising:
detecting that one or more received events are located in an events list, wherein events stored in the events list are associated with a set of functions that are known to cause a clock domain crossing between the buffer manager and a host system;
enabling access to a line cache;
determining one or more functions of the set of functions that correspond to the one or more received events; and
running, using the high-speed mode driver, in a high-speed mode to execute the one or more functions out of the line cache on behalf of the host system.

* * * * *